June 18, 1957   G. A. MORTON ET AL   2,796,533
LOGARITHMIC COUNT RATE OR FREQUENCY METER
Filed April 27, 1953
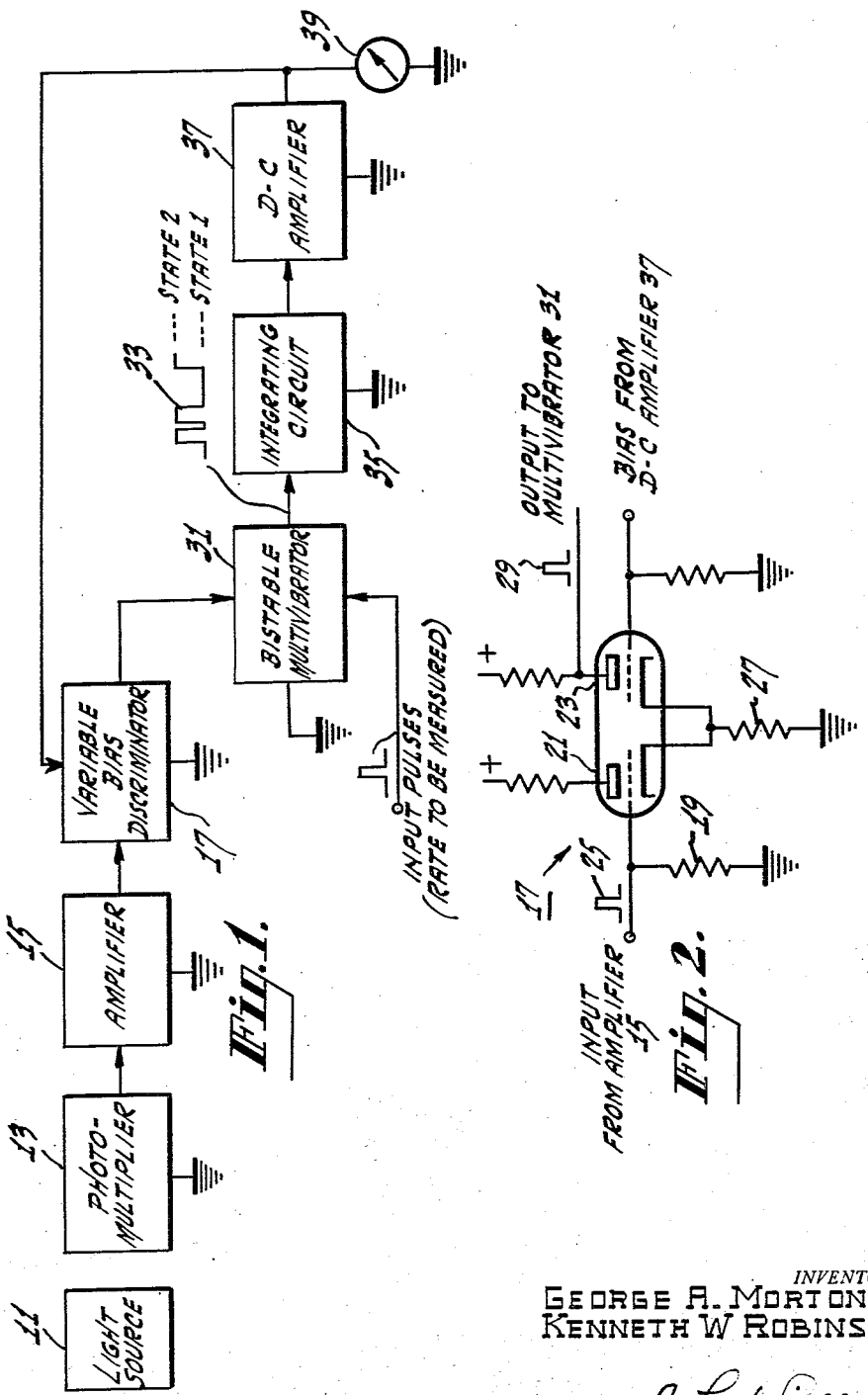
INVENTORS
GEORGE A. MORTON &
KENNETH W ROBINSON
BY *J. L. Whittaker*
ATTORNEY

2,796,533
LOGARITHMIC COUNT RATE OR FREQUENCY METER

George A. Morton and Kenneth W. Robinson, Princeton, N. J., assignors to Radio Corporation of America, a corporation of Delaware Application April 27, 1953, Serial No. 351,218

The terminal fifteen years of the term of the patent to be granted has been disclaimed 7 Claims. (Cl. 250—214)

This invention relates generally to electrical measuring instruments and particularly to a new and improved count rate or frequency measuring meter which operates over a wide counting or frequency range.

Previously a number of different instruments have been devised for use as count rate or frequency measuring instruments. Many of these instruments are utilized in connection with scintillation counters or employ relatively expensive ionization tubes such as Geiger tubes in which a gas is ionized each time a pulse to be counted is applied to the tube. Other types of apparatus employ conventional circuitry not requiring special purpose tubes. Some of both of the above types of apparatus utilize indicator scales which are linear reading. Since these scales are essentially linear it often is necessary to provide scale switching or other means which permit the apparatus to operate over an appreciable count or frequency range.

It is an object of the present invention to provide an improved count rate or frequency measuring instrument.

Another object of the invention is to provide an improved count rate or frequency measuring instrument in which a logarithmic indication is afforded.

Another object of the invention is to provide an improved count rate or frequency measuring instrument capable of measuring pulse count rates over a range of the order of $10^5$ pulses per second and capable of measuring signal frequencies over a like range.

A further object is to utilize the phenomena of the logarithmic distribution in the height of pulses derived in response to single electrons entering a secondary emission multiplier for providing a logarithmic instrument of the above type.

According to the present invention, the foregoing objects and advantages may be accomplished as follows. In a typical embodiment of the invention, randomly occurring input pulses (the average rate of occurrence of which is to be determined) are applied to one input circuit of a dual-input bistable multivibrator. A light source irradiates the photocathode of a photomultiplier tube to liberate electrons therefrom. These electrons enter the electron multiplier section of the tube and produce at its output pulses having a logarithmic pulse height distribution. These pulses are applied to the remaining input circuit of the multivibrator. An output signal is then derived from the multivibrator which signal is averaged and utilized to control the threshold which pulses must attain to trigger the bistable device so that a constant ratio of multiplier and input pulses trigger the multivibrator. The averaged output signal voltage is a measure of the logarithmic count rate.

The invention will be described in greater detail with reference to the accompanying drawing in which:

Figure 1 is a schematic circuit diagram, in block form, of a logarithmic count rate or frequency measuring instrument, according to the invention; and, Figure 2 is a circuit diagram of a variable bias discriminator used in the apparatus of Figure 1.

Similar reference characters are applied to similar elements throughout the drawing.

Referring to Figure 1, a substantially constant intensity light source 11, such as an incandescent lamp, is positioned adjacent the cathode of a photomultiplier device 13 so that most of the light photon energy emitted by the source initiates electron emission from the cathode. The electrons liberated in response to the incident light photon energy are amplified in successive dynode stages of the electron multiplier section of the device 13. The photomultiplier output comprises pulses having a distribution of pulse heights which (at pulse heights which are large compared to the average pulse height which would be derived from a single electron) is quite close to a logarithmic curve. The photomultiplier output may be further amplified, if desired, by means of a pulse amplifier 15 which is coupled to the output circuit of the device 13. The pulse output signals from the amplifier 15 are then applied to a variable bias discriminator 17, for example, as shown in Figure 2.

Referring to the discriminator illustrated in Figure 2, amplified photomultiplier pulses are developed across a resistor 19 in the input circuit of one 21 of two tubes 21, 23 (preferably a double-triode structure within a single envelope) which are connected as a cathode-coupled amplifier. Tube 21 initially is cut off. A given positive input pulse 25 drives the tube 21 into conduction and substantially simultaneously causes the potential developed across the cathode resistor 27, common to both tubes to increase. The cathode potential increase causes the negative bias of tube 23 to increase and its respective electron current conduction to decrease. Under these conditions the voltage at the anode of tube 23 becomes more positive. The anode voltage remains at this more postive value until pulse 25 no longer is applied to tube 21. Tube 21 then is again in cut-off. At this time the anode voltage of tube 23 returns to its initial or "no-pulse" value. An amplified positive going pulse 29 thus is provided at the output of the discriminator for each positive input pulse applied thereto and having an amplitude great enough to drive tube 21 into conduction. The bias applied to the grid of tube 23 determines the pulse height threshold which input pulses such as 25 must attain before an output pulse is derived from the output circuit of tube 23. Means for automatically controlling the bias will be shown below.

Referring again to Figure 1, pulse signals derived from the photomultiplier in the manner described above are applied to one input circuit of a dual-input bistable multivibrator 31. Multivibrator 31 may be of the type illustrated at page 174 (Figures 4–8) of Ultra-High Frequency Techniques by Brainerd, Koehler, Reich, and Woodruff (D. Van Nostrand—1946). Randomly occurring pulse signals, the rate of recurrence of which is to be measured, are applied to the remaining input circuit of the multivibrator 31. The application to the multivibrator of pulses from the photomultiplier circuitry causes the multivibrator to be set to one of its two stable conditions (state 1) and pulses at the rate to be measured set the device to its other bistable condition (state 2).

Since the multivibrator is actuated by dual inputs and is set thereby to either state 1 or state 2 the voltage at the output of the multivibrator varies between these limits to provide a square wave type of output signal 33. The multivibrator output wave signal 33 is applied to an integrating circuit 35, for example, a low pass filter, wherein the multivibrator voltage is averaged. Preferably the averaged voltage is then amplified in a D.-C. amplifier 37. The output of the D.-C. amplifier circuit (a positive voltage) is then fed back and applied to the bias circuit of the variable bias discriminator 17. The feedback voltage automatically adjusts the bias of the discriminator 17, so that a constant ratio of photomultiplier and pulses to be measured triggers the multivibrator. In the present example this ratio is one-half. A meter 39 or other suitable indicating device is connected to the output of the D.-C. amplifier 37 and calibrated logarithmically to provide a direct reading of the pulse count rate.

While the foregoing description primarily has been directed to the operation of the apparatus as a count rate meter, the invention is equally useful as a frequency measuring device. Sinusoidal waves at the frequency to be measured may be limited and differentiated in a known manner to obtain pulse signals. These pulse signals may then be applied to the bistable multivibrator in the same manner as herein described with reference to randomly occurring pulses. The output meter again is calibrated logarithmically and in this instance provides an indication of the frequency of the sinusoidal input signals.

The instrument herein described thus affords relatively simple and practical means for measuring the count rate or frequency of pulse or sinusoidal signals corresponding to nuclear or other phenomena. The instrument provides such measurement with reasonable accuracy over a relatively wide range having a ratio of counting rates of the order of $10^5$. Also the present apparatus does not require undesirable scale changing.

What is claimed is:

1. An electrical measuring apparatus comprising, connection means for receiving input signals the count rate or frequency of which is to be measured, means for generating pulses having a logarithmic pulse height distribution, a signal conveying channel coupled to said pulse generating means biased to pass only pulses having pulse heights great enough to overcome said bias, means coupled to said connection means and said signal conveying channel responsive to said passed and said input signals for producing a direct-current voltage having an amplitude proportional to the ratio of pulses separately applied thereto, and feedback means for applying said direct-current voltage to said signal conveying channel for controlling the bias of said channel such that the ratio of pulses applied to said direct-current voltage producing means is constant.

2. An electrical measuring instrument comprising, connection means for receiving input signals the count rate or frequency of which is to be measured, means for generating pulses having a logarithmic pulse height distribution, a signal conveying channel coupled to said pulse generating means including bias means for biasing said channel to pass only pulses having pulse heights great enough to overcome said bias, means coupled to said connection means and said signal conveying channel responsive to said passed and said input signals for producing a direct-current voltage having an amplitude proportional to the ratio of pulses separately applied thereto, feedback means for applying said direct-current voltage to said signal conveying channel for controlling the bias of said channel such that the ratio of pulses applied to said direct-current voltage producing means is constant, and an indicator coupled to said feedback means for providing an indication of the amplitude of said feedback voltage.

3. An electrical measuring instrument comprising, connection means for receiving input signals the count rate or frequency of which is to be determined, means for generating pulses having a logarithmic pulse height distribution, a signal conveying channel coupled to said pulse generating means biased to pass only pulses having pulse heights great enough to overcome said bias, a bistable multivibrator having separate input circuits coupled to said connection means and said signal conveying channel, said multivibrator being set to a first stable condition with an input from said source connection means applied thereto and being set to a second stable condition with an input from said signal conveying channel applied thereto, means coupled to said multivibrator for producing a direct-current voltage having an amplitude proportional to the ratio of pulses separately applied thereto, and feedback means for applying said direct-current voltage to said signal conveying for controlling the bias of said channel such that the ratio of pulses applied to said multivibrator is constant.

4. A measuring instrument as claimed in claim 3 including an indicator coupled to said feedback means for providing an indication of the amplitude of said feedback voltage.

5. An electrical measuring instrument comprising, connection means for receiving input signals the count rate or frequency of which is to be measured, means including a constant intensity light ray source and a secondary emission electron multiplier responsive to said light ray source for generating pulses having a logarithmic pulse height distribution, a signal conveying channel coupled to said multiplier and biased to pass only pulses having pulse heights great enough to overcome said bias, means coupled to said connection means and said signal conveying channel responsive to said passed and said input signals for producing a direct-current voltage having an amplitude proportional to the ratio of pulses separately applied thereto and means for applying said direct-current voltage to said signal conveying channel for controlling the bias of said channel such that the ratio of pulses applied to said direct-current voltage producing means is constant.

6. A logarithmic count rate meter comprising, connection means for receiving input signals the rate of which is to be measured, means including a secondary emission electron multiplier for generating pulses having a logarithmic pulse height distribution, a signal conveying channel coupled to said pulse generating means biased to pass only pulses having pulse heights great enough to overcome said bias, a bistable multivibrator having separate input circuits coupled to said connection means and said signal conveying channel, said multivibrator being set to a first stable condition with an input from said source connection means applied thereto and being set to a second stable condition with an input from said signal conveying channel applied thereto, an integrating circuit coupled to said multivibrator for producing a direct-current voltage having an amplitude proportional to the ratio of pulses separately applied thereto, a direct-current amplifier coupled to said integrating circuit for amplifying said direct-current voltage, feedback means for applying said amplified direct-current voltage to said signal conveying channel for controlling the bias of said channel such that the ratio of pulses applied to said multivibrator is constant, and an indicator coupled to said feedback means for providing an indication of the amplitude of said feedback voltage.

7. An electrical measuring apparatus comprising, connection means for receiving input signals the count rate or frequency of which is to be measured, means for generating pulses having a logarithmic pulse height distribution, a signal conveying channel coupled to said pulse generating means biased to pass only pulses having pulse heights great enough to overcome said bias, means coupled to said connection means and said signal conveying channel responsive to said passed and said input signals for producing a direct-current voltage having an amplitude proportional to the ratio of pulses separately applied thereto, and feedback means for applying said direct-current voltage to said signal conveying channel for controlling the bias of said channel such that the ratio of pulses applied to said direct-current voltage producing means is constant.

References Cited in the file of this patent

UNITED STATES PATENTS

| | | |
|---|---|---|
| 2,454,871 | Gunderson | Nov. 30, 1948 |
| 2,576,661 | Wouters | Nov. 27, 1951 |
| 2,582,831 | Hester | Jan. 15, 1952 |
| 2,610,303 | Bell | Sept. 9, 1952 |
| 2,659,011 | Youmans et al. | Nov. 10, 1953 |